(12) United States Patent
Bai et al.

(10) Patent No.: US 11,190,287 B2
(45) Date of Patent: Nov. 30, 2021

(54) PROACTIVE BEAM MANAGEMENT TO AVOID CHANNEL FAILURE OR DEGRADED CHANNEL CONDITIONS

(71) Applicant: QUALCOMM Incorporated, San Diego, CA (US)

(72) Inventors: Tianyang Bai, Bridgewater, NJ (US); Kiran Venugopal, Raritan, NJ (US); Jung Ho Ryu, Fort Lee, NJ (US); Juergen Cezanne, Ocean Township, NJ (US); Hua Wang, Basking Ridge, NJ (US); Vasanthan Raghavan, West Windsor Township, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 16/689,207

(22) Filed: Nov. 20, 2019

(65) Prior Publication Data

US 2020/0259575 A1 Aug. 13, 2020

Related U.S. Application Data

(60) Provisional application No. 62/802,848, filed on Feb. 8, 2019.

(51) Int. Cl.
*H04B 17/373* (2015.01)
*H04B 17/24* (2015.01)
*H04W 36/30* (2009.01)
*H04B 7/06* (2006.01)
*H04B 7/08* (2006.01)
*H04W 8/00* (2009.01)

(52) U.S. Cl.
CPC ......... *H04B 17/373* (2015.01); *H04B 7/0617* (2013.01); *H04B 7/0695* (2013.01); *H04B 7/086* (2013.01); *H04B 7/0862* (2013.01); *H04B 17/24* (2015.01); *H04W 8/005* (2013.01); *H04W 36/305* (2018.08)

(58) Field of Classification Search
CPC .. H04W 8/005; H04W 36/305; H04B 17/373; H04B 17/24; H04B 7/0617; H04B 7/0862; H04B 7/086; H04B 7/008; H04B 7/0695
See application file for complete search history.

(56) References Cited

U.S. PATENT DOCUMENTS

2006/0165008 A1* 7/2006 Li ................. H04B 7/0854
    370/252
2007/0254602 A1* 11/2007 Li ................. H04B 17/3913
    455/88

(Continued)

OTHER PUBLICATIONS

International Search Report and Written Opinion—PCT/US2020/014893—ISA/EPO—dated May 12, 2020.

*Primary Examiner* — Mewale A Ambaye

(57) ABSTRACT

In an aspect of the disclosure, methods, a computer-readable media, and apparatus are provided. An apparatus may be a wireless communication device. The apparatus may predict a future channel condition for a wireless communication channel between a wireless communication device and the UE. The apparatus may transmit an indication of the future channel condition to the wireless communication device.

36 Claims, 10 Drawing Sheets

(56) References Cited

U.S. PATENT DOCUMENTS

| | | | |
|---|---|---|---|
| 2012/0082198 A1* | 4/2012 | Zhang | H04B 17/373 |
| | | | 375/224 |
| 2017/0359106 A1* | 12/2017 | Wilson | H04B 7/0408 |
| 2019/0075569 A1* | 3/2019 | Zhang | H04B 7/0632 |
| 2019/0173740 A1* | 6/2019 | Zhang | H04W 72/042 |
| 2020/0007247 A1* | 1/2020 | Gulati | H04L 1/0009 |
| 2020/0008261 A1* | 1/2020 | Islam | H04W 52/0216 |

* cited by examiner

PROACTIVE BEAM MANAGEMENT TO AVOID CHANNEL FAILURE OR DEGRADED CHANNEL CONDITIONS

CLAIM OF PRIORITY UNDER 35 U.S.C. § 119

The present application for patent claims priority to Provisional Application No. 62/802,848 entitled "PROACTIVE BEAM MANAGEMENT" filed Feb. 8, 2019 and assigned to the assignee hereof and hereby expressly incorporated by reference herein.

BACKGROUND

Technical Field

The present disclosure relates generally to communication systems, and more particularly, to methods and systems for proactive beam management.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR technology is expected to facilitate autonomous vehicles by enabling communication between vehicles (V2V), as well as other types of vehicle communication such as vehicle to network (V2N), vehicle to infrastructure (V2I), vehicle to pedestrian (V2P), etc., all of which may broadly be categorized as vehicle to everything (V2X) communication. Some aspects of 5G NR may be based on the 4G Long Term Evolution (LTE) standard.

Wireless networks, including network that implement LTE, NR, and other standards provide wireless communication services to various types of devices. Depending on the quality of a communication link between two devices, increased dependability, reduced latency, and/or increased data rates may be achieved. There exists a need for further improvements in maintaining high quality communication links between devices in wireless systems including 5G NR technology. These improvements may also be applicable to other wireless technologies and the telecommunication standards.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In one embodiment, a user equipment (UE) may perform a method of wireless communication with another wireless device. The UE may predict a future channel condition for a wireless communication channel between a wireless communication device and the UE. The UE may transmit an indication of the future channel condition to the wireless communication device.

In one embodiment, a base station may perform a method of wireless communication based on predictions of a wireless communication device. The base station may receive an indication of a future channel condition from a wireless communication device. The base station may communicate with the wireless communication device based on the indication of the future channel condition.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
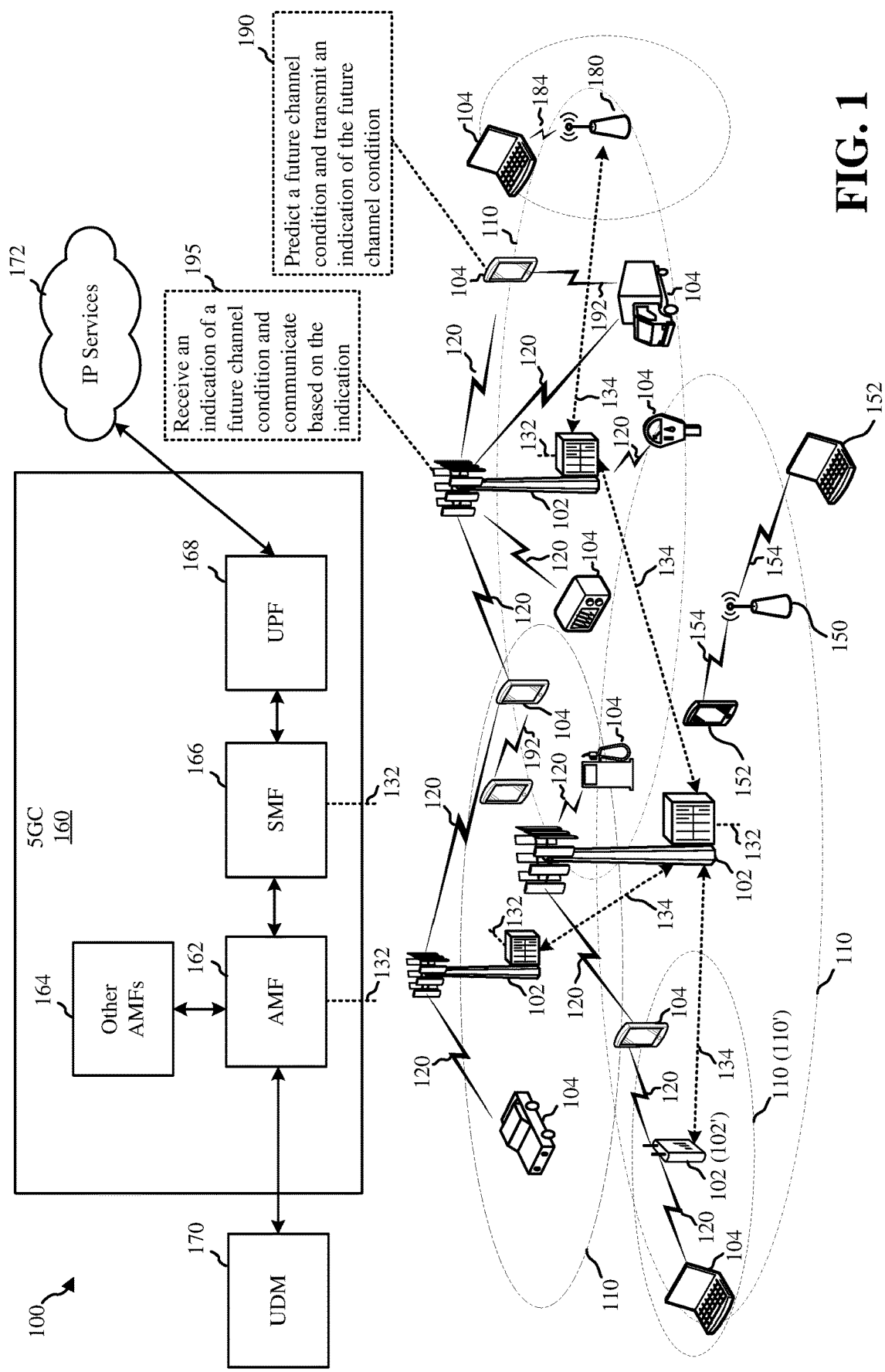
FIG. 1 is a diagram illustrating of a wireless communications system and an access network, in accordance with certain aspects of the disclosure.

Communication services in wireless networks take place over a wireless link between two devices, often a UE and a base station or other device. The wireless link may represent a logical connection between the devices. The path and/or medium on which signals travel may be referred to as a channel. When the channel quality is high, improved latency and data throughput may be achieved on the link. When channel quality is low, increased control overhead, lower coding rates, and an increased number of retransmissions may reduce throughput and increase latency for the link. Channel quality is affected by reflectors, objects, distance, and other aspects of the channel. If the quality of a channel degrades or fails, a different channel or even a different base station or access node may be selected for communication. A different channel may be selected by utilizing different antennas or by using transmit and/or receive beamforming. For example, if one beam fails (e.g., the corresponding channel no longer carries signals well), a different beam that still has good enough quality may be selected for communications. Or, the UE may be handed over to a different cell or node.

In some cases, channel quality may be tracked based on reference signals or other communications. In some cases, a UE may transmit an indication to a base station when a channel or beam has failed. However, reporting after a channel experiences problems may require the UE to experience a lower quality services before remedial steps can be taken. Additionally, reference signals, corresponding reports, and/or resources allocated for recovering from failed beams may require extra resource overhead.

In recognition of the foregoing, it may be beneficial for a UE to predict future channel quality. At least some aspects discussed herein disclose predicting a future channel condition at a UE. In response to predicting the future channel condition, the UE may send an indication of the future channel quality to a scheduling entity, such as a base station. The base station may receive the indication of the future channel quality and may communicate with the UE based on the indication. For example, the BS may adjust a communication parameter, change a beam, or hand the UE over to a different base station or cell. At least some aspects disclosed herein allow for proactive link or beam management so that channel failure or degraded channel conditions are avoided before they occur.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a 5G Core (5GC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN), Next Generation RAN (NG-RAN)) interface with the 5GC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the 5GC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW RF band has extremely high path loss and a short range. The mmW base station 180 may utilize beamforming 184 with the UE 104 to compensate for the extremely high path loss and short range.

The 5GC 160 may include an Access and Mobility Management Function (AMF) 162, other AMFs 164, a Session Management Function (SMF) 166, and a User Plane Function (UDP) 168. The AMF 162 may be in communication with a Unified Data Management (UDM) 170. The AMF 162 is the control node that processes the signaling between the UEs 104 and the 5GC 160. Generally, the AMF 162 provides QoS flow and session management. All user Internet protocol (IP) packets are transferred through the UPF 168. The UPF 168 provides UE IP address allocation as well as other functions. The UPF 168 is connected to the IP Services 172. The IP Services 172 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the 5GC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, a vehicle UE (VUE) or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, a UE 104 may predict 190 a future channel condition for a link between the UE 104 and another wireless device and transmit an indication of the future channel condition. The UE 104 may predict the future channel condition based on previous channel conditions, sensor data from one or more sensors of the UE 104, or the like. The indication may indicate that the future channel condition is predicted to be above or below a threshold and/or above or below a current channel condition. A base station 102, or other wireless device, may receive 195 the indication of the future channel condition from the UE 104 and communicate with the UE 104 based on the indication. For example, the base station 102 may do one or more of the following: change a beam used to communicate with the UE 104; hand the UE 104 over to a different node, cell, or transmit/receive point (TRP); or change a communication parameter used to communicate with the UE 104.

Figures 2A, 2B:
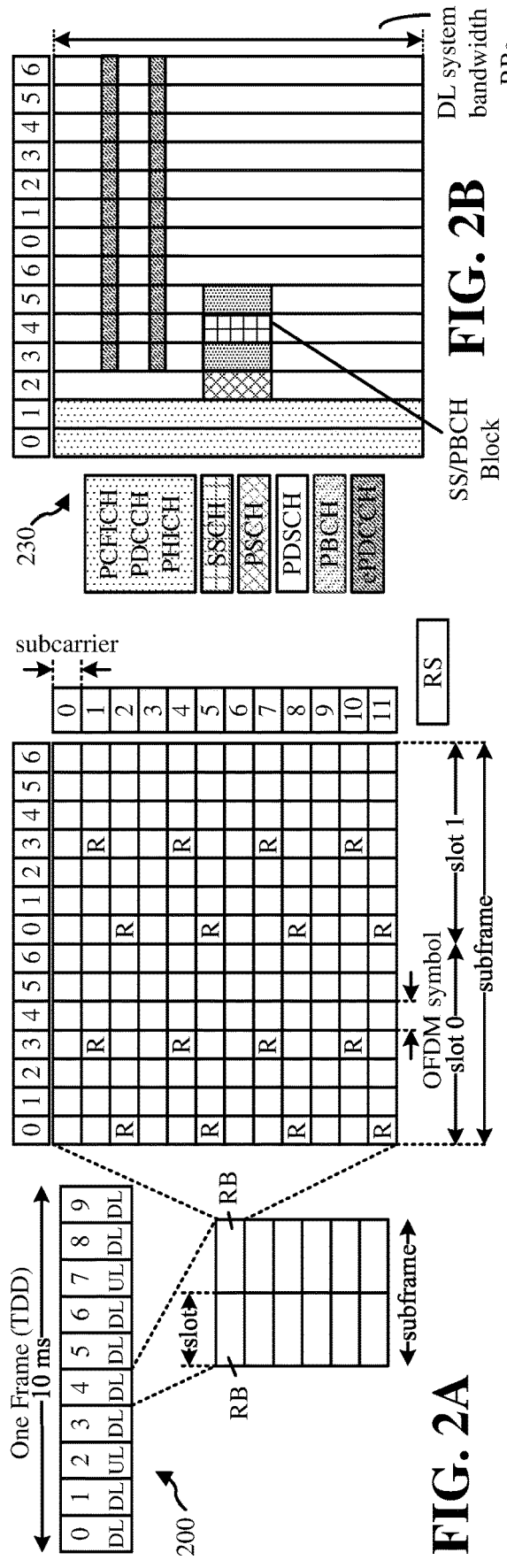
FIGS. 2A, 2B, 2C, and 2D are diagrams illustrating a DL subframe, DL channels within the DL subframe, an UL subframe, and UL channels within the UL subframe, respectively, for a 5G/NR frame structure, in accordance with certain aspects of the disclosure.
Figures 2C, 2D:
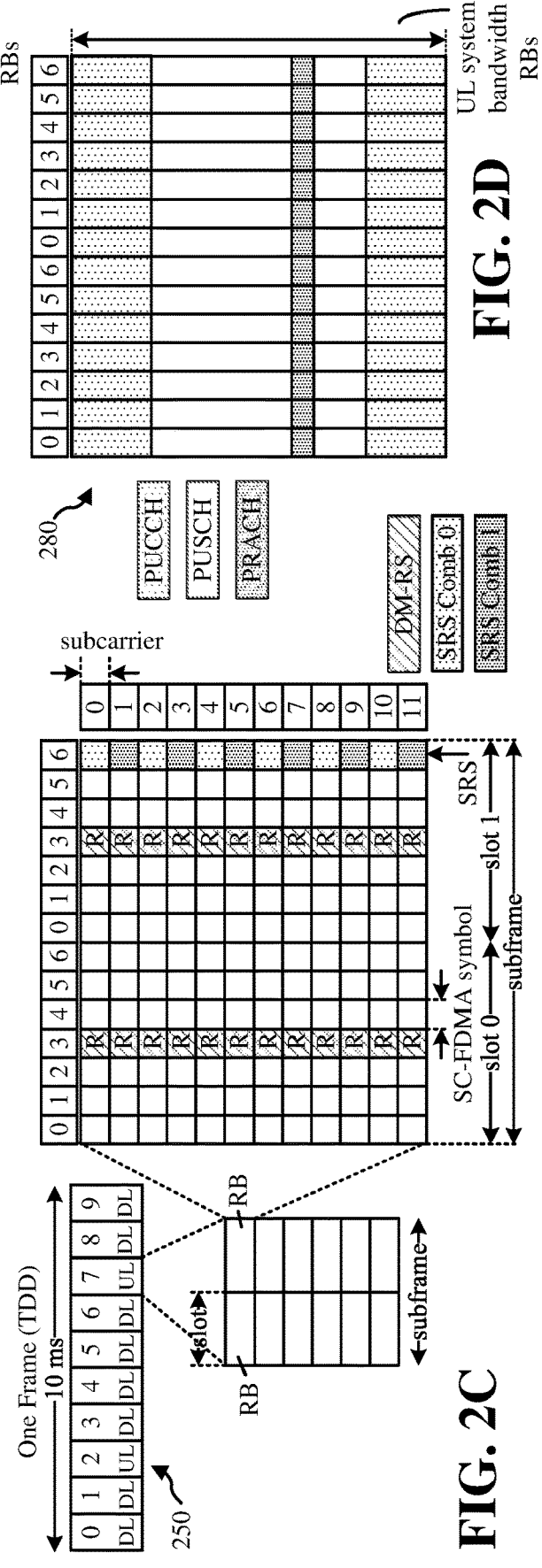

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^{\mu}*15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. In one aspect, in CoMP, the SRS may be used by a base station for channel quality estimates which may be used for cluster management and scheduling (e.g., identifying TRPs that may cooperate to transmit to a UE).

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data and may additionally be used to carry a buffer status report (BSR), a power headroom report (PHR), and/or UCI.

Figure 3:
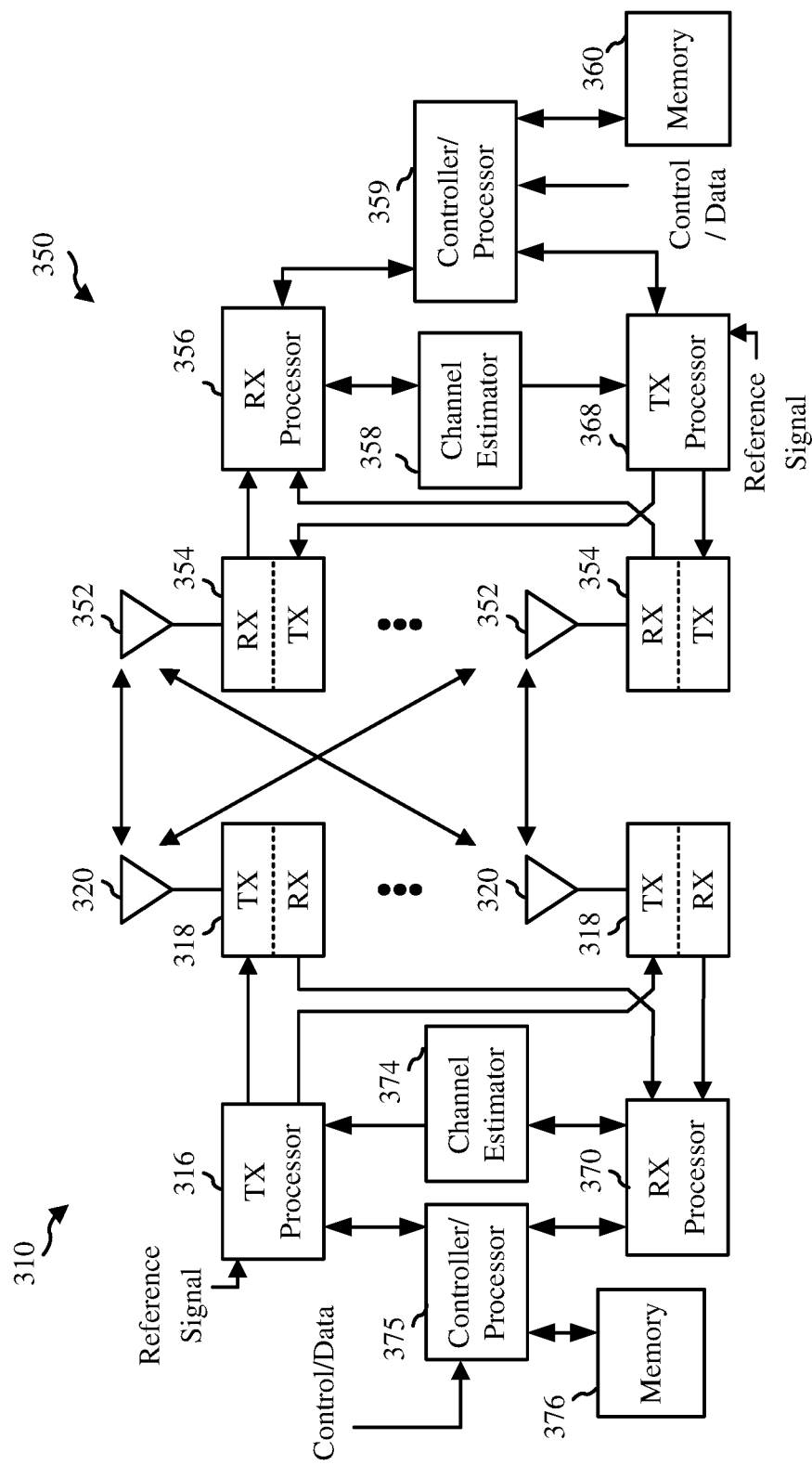
FIG. 3 is a diagram illustrating an example of a base station and UE in an access network, in accordance with certain aspects of the disclosure.

FIG. 3 is a block diagram of a base station 310 in communication with a UE 350 in an access network. In the DL, IP packets from the 5GC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the 5GC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the 5GC 160. The controller/processor 375 is also responsible for error detection using an ACK and/or NACK protocol to support HARQ operations.

As discussed previously, performance of wireless communication services depends on a quality of a wireless channel between a transmitter and a receiver. Some wavelengths, such as mmW bands, rely on directional beamforming to overcome high path loss. Often, communications in mmW NR systems are performed using a directional beam pair (a TX beam at a transmitter and an RX beam at a receiver). Due to mobility or dynamic blockages, a channel quality for the beam pair may vary over time. One way to maintain link quality is through beam management during which a base station 102, or other device, sends reference signals to a UE 104. The reference signals allow the UE 104 to monitor link quality by measuring or determining channel metrics such as a reference signal received power (RSRP), a signal-to-noise ratio (SNR), a CQI, or another channel metric. The UE 104 may feedback the results and the base station 102 or other device may make decisions about how to communicate with the UE 104. For example, a base station 102 may send an instruction to switch a beam, hand the UE 104 over to a different node or cell, or the like. In case a UE 104 detects a link failure before a base station decides to switch the beam, a procedure of beam failure recovery (BFR) may also be used. BFR generally may have a certain delay/out-of-service time and may require dedicated resources (e.g. RACH resources) to recover a beam.

Figure 4:
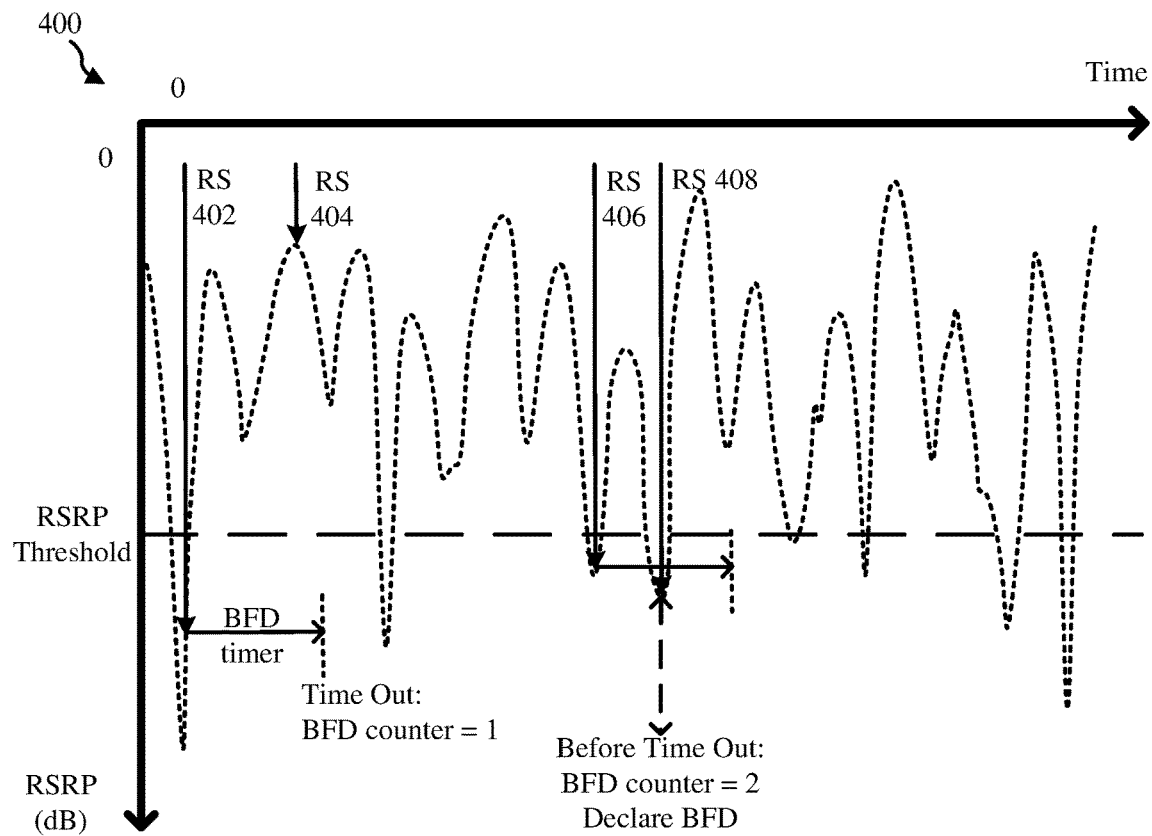
FIG. 4 is a graphical diagram illustrating beam failure detection in accordance with certain aspects of the disclosure.

FIG. 4 is a graphical diagram 400 illustrating beam failure detection (BFD) in response to link degradation, according to one example. The diagram 400 illustrates a channel RSRP over time, but any other channel metric or condition may be used in other embodiments. At 402, a first reference signal (RS) is sent on the channel. A UE 104 measures the channel and determines that the RSRP is below an RSRP threshold (e.g., −14 dB). The RSRP threshold may be a value configured at the UE 104 or by a network for detecting the failure of a beam. Based on the detection, the UE 104 begins a BFD timer and increments a BFD counter. The BFD counter indicates the number of times a measured RS is below the RSRP threshold. At 404, a second RS is sent on the channel and the UE 104 measures the RS to be above the RSRP threshold. Because the second RS is above the RSRP threshold the BFD counter is not incremented. Upon expiring of the BFD timer (i.e., "Time Out") the BFD counter is 1 which is less than a BFD trigger value (the value needed to trigger BFD). In this example, the BFD trigger value=2. At 406, a third RS is sent and the RSRP is measured below the RSRP threshold. The UE 104 increments the BFD counter, setting it to 1 and starts the BFD timer. At 408, a fourth RS is sent and the RSRP is again below the RSRP threshold. The BFD counter is incremented to 2 and BFD is declared because the BFD counter equals BFD trigger value before expirations of the BFD timer. The UE 104 declares BFD by transmitting a signal to the base station indicating BFD.

The BFD illustrated in relation to FIG. 4 may be characterized as non-predictive or reactive BFD because it is based on the occurrence(s) of the failure (e.g. low measured RSRP) of the wireless channel. Thus, the wireless channel must fail before BFD is declared and remedial steps are taken. Communication may be disconnected when recovering the link using the above method for BFD or beam failure recovery (BFR). Furthermore, large amounts of resources for contention free based RACH for BFR may also be used.

In at least some embodiments, it may be more desirable to predict the channel qualities of different beams/beam pairs and switch to a better beam before beam failure happens. At times, beam failure events may be predicted based on previous measurements and/or side information. Based on predictions, the UE 104, BS 102, or other device can proactively switch beams or links in advance. This can reduce the frequency of BFD/BFR and lead to reduced resource requirements and less disconnection time.

If channel prediction is to be used for beam/link management, channel prediction may be performed at one or both sides of a link. If a base station 102 (e.g., a gNB) is communicating with a UE 104, prediction could be performed at the base station 102, at the UE 104, or at a combination of both. If the base station 102 predicts the channel quality, it may use channel state information (CSI) feedback of a downlink reference signal and/or measurements based on an uplink reference signal from the UE 104 to predict channel quality of a future time. Based on the prediction, the base station 102 may request a beam switch of a serving channel or send newly scheduled data on a good beam pair.

On the other hand, for UE 104 side prediction, the UE 104 may use CSI measurements from downlink reference signals, its own side information (moving speed, delay spread) and/or feedback and other side information (e.g., information from a base station 102 or from sensors of the UE 104) to predict channel quality. The UE 104 may send back information regarding a prediction at specific times or based on detection of specific conditions. For example, a prediction report may be periodically sent as configured by the base station 102, based on base station 102 request, or based on event-triggering (such as when UE 104 predicts a beam failure will happen within the next X number of slots).

UE-side prediction may provide some advantages over BS-side predictions, in at least some aspects. For example, if a reference signal used for channel measurement is in the downlink, the feedback of the channel metric is normally with quantization error. This introduction of channel error may reduce prediction accuracy. Furthermore, a good accuracy of predictions may require frequently sending reference signals and allocating resources for the UE 104 to feedback results, which may significantly increase overhead. Furthermore, with base station 102 prediction and control/scheduling on the channel, the base station 102 may be unaware of certain side information at UE 104 that may be important for prediction. For example, the base station 102 may not have access to sensor data, usage state, or the like without further increasing overhead to allow the UE 104 to report these details to the base station 102. By way of example, a UE 104 may adjust/alter a receive beam, which is transparent to a base station 102 in certain embodiments. A further example is that the UE 104 may detect a speed change, change in delay spread, or environmental change which may be useful information for prediction. Thus, at least some embodiments disclosed herein contemplate link/beam prediction by a UE 104.

Figure 5:
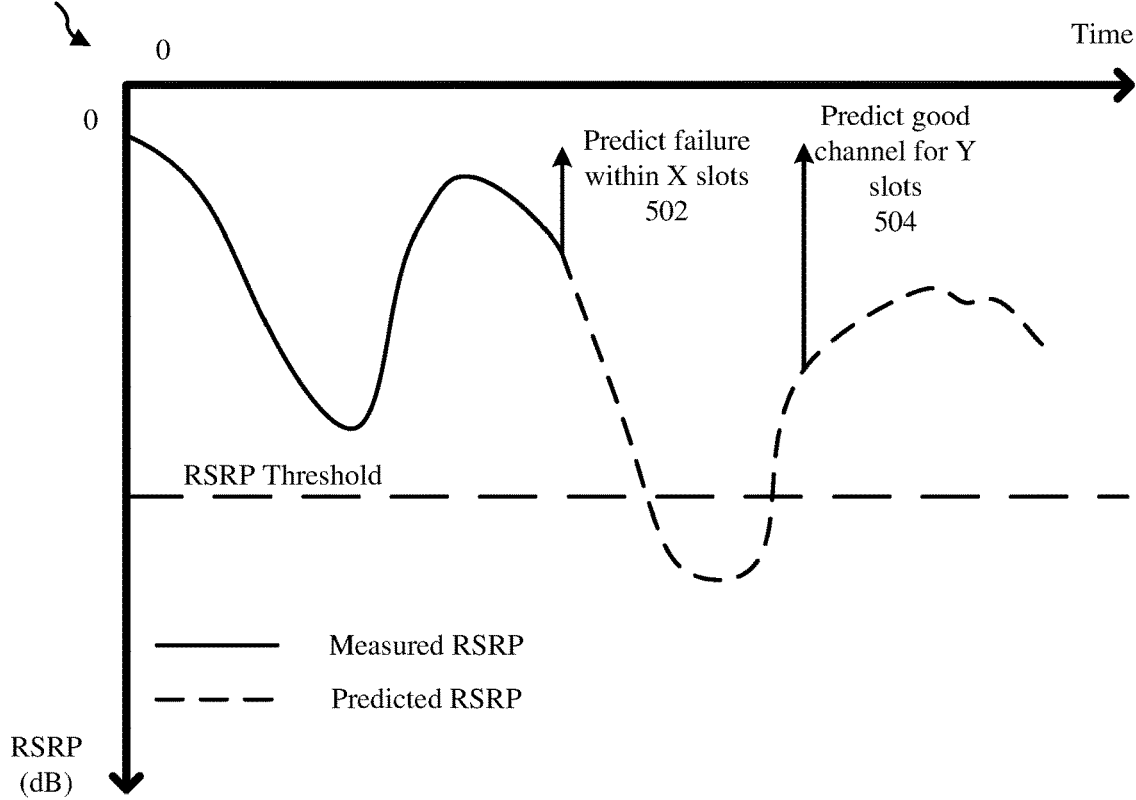
FIG. 5 is a graphical diagram illustrating proactive beam management in accordance with certain aspects of the disclosure.

FIG. 5 is a graphical diagram 500 illustrating RSRP on a downlink channel between a UE 104 and a base station 102 during proactive beam management, according to one illustrative embodiment. The diagram 500 illustrates a channel RSRP over time, but any other channel metric or condition is contemplated and may be used in other embodiments. The solid line of the RSRP curve represents RSRP measured by the UE 104 based on reference signals sent by the base station 102 (or another wireless device). For example, points on the solid line may represent a series or set of previous measurements on the channel. Based on a set of the previous measurements (e.g., a number X of previous sequential measurements) the UE 104 may predict a future RSRP curve, represented by the broken line in FIG. 5.

The UE 104, which may include a UE 104 of FIG. 1 or a UE 350 of FIG. 3 or any other UE discussed herein, may repeatedly feed a set of one or more previous measurements or other data into a prediction algorithm to generate a future curve, a predicted chance of failure within a specific time period (e.g., within a number X of slots), or other prediction for the channel. The prediction algorithm may utilize prediction methods or algorithms such as a deep learning neural network with long and/or short-term memory, a Kalman filter, or various other algorithms or methods. In some cases, a method used to predict future channel conditions may be specified by a wireless standard, may be previously configured by a base station 102, or may be up to UE 104 implementation. In some cases, a standard or configuration may require a minimum level of accuracy for a prediction algorithm. For example, the algorithm may be required to predict future channel failure with fewer than a certain percentage of false positives and/or with a certain percentage of false negatives. The UE 104 may transmit an indication of a prediction along with a confidence level, a historical accuracy for similar predictions, or the like.

With reference again to FIG. 5, the UE 104 predicts, at 502, a beam or link failure will occur within a number X of slots, or other time period. The UE 104 may transmit, at 502, an indication of the prediction to a base station 102. The indication may include a request to switch beams or may indicate that a failure is predicted for the beam/channel. The UE 104 may also indicate a confidence level for the prediction. Based on receiving the indication of the prediction, a base station 102 or other communication device may remain on a current beam, instruct the UE 104 to switch to a different link or beam, or the like.

At 504, the UE 104 predicts that the channel will remain good for a number Y of slots. The prediction may be based on measured channel conditions before the prediction of failure at 502, or the UE 104 may continue to monitor the channel, even if it has switched to another channel. Based on measurement of channel conditions on the channel, the UE 104 may predict that the link or beam may have good enough channel conditions for Y slots. The UE 104 may transmit an indication of the prediction of the good channel for Y slots. Based on receiving the indication of the good channel, a base station 102 or other device may switch communications with the UE 104 to the corresponding link or beam.

In one embodiment, a UE 104 may monitor RSRP, or other channel metric, on a plurality of different links or beams. The plurality of different links or beams that are monitored may include a current channel or beam and/or a plurality of channels or beams that are not currently used. This may allow a UE 104 to predict channel conditions not only for a current channel or beam, but also to predict channel conditions for other available channels or beams.

A UE 104 may predict channel quality based on past observations of some channel metric, such as one or more of an RSRP, a SNR, CQI, RI, PMI, or the like. These past observations may be based on signals, such as reference signals sent from a second device. The UE 104 may also predict future channel quality based on side information, or information other than past observations of the current channel. This side information may include past observations of different channels, sensor data of the UE 104, and/or configured parameters sent by a second device (such as a base station or network entity).

When predicting future channel conditions, the UE 104 may utilize a method or algorithm that has been agreed upon or configured. The method or algorithm may be required to meet a minimum accuracy requirement based on a set of test data or based on historical predictions. The method or algorithm may be a configured by the second device or a network entity. For example, the method or algorithm may be a specific method or algorithm agreed for predicting channel conditions for the wireless network.

The UE 104 may report information based on the prediction to a second device, such as a base station 102. The report may be sent based on a request from the second device or a periodic reporting configuration indicated by the second device. The report may be triggered based on a prediction that a channel metric will fall below a threshold. Event based reporting may reduce the number or reports that need to be sent on the channel when the channel remains in good condition. The UE 104 may report the prediction information based on signaling from the second device or a configuration received from the second device or a network entity. The report transmitted by the UE 104 may contain a confidence level or historical statistics of past errors in predictions.

The second device, such as another UE 104, a base station 102, or other wireless communication device, may receive the report or other indication of a prediction by the UE 104. The prediction may indicate that a specific metric is predicted to fall below a threshold within a certain time period. The report may be received in response to a request by the second device to receive predictions from the UE 104. The second device may send a signal indicating a configuration for reporting. The configuration may indicate when a report of a prediction is to be sent, the time or frequency resources to be used, an approved method or algorithm to be used, a required confidence level or accuracy level for a report, and/or other details. The second device may also send reference signals on one or more beams or links to allow the UE 104 to measure channel conditions and perform predictions based at least in part on those measured channel conditions.

Based on the report or indication of the prediction received from the UE 104, the second device may make a scheduling decision based on the report. The scheduling decision may include a timing for a transmission such that it avoids a time when the channel is predicted to have low quality. The scheduling decision may include an instruction to switch beams or to handover from a current cell to a neighboring cell. The second device may also ignore the prediction if it prefers to maintain the UE 104 on the current channel or beam.

Figure 6:
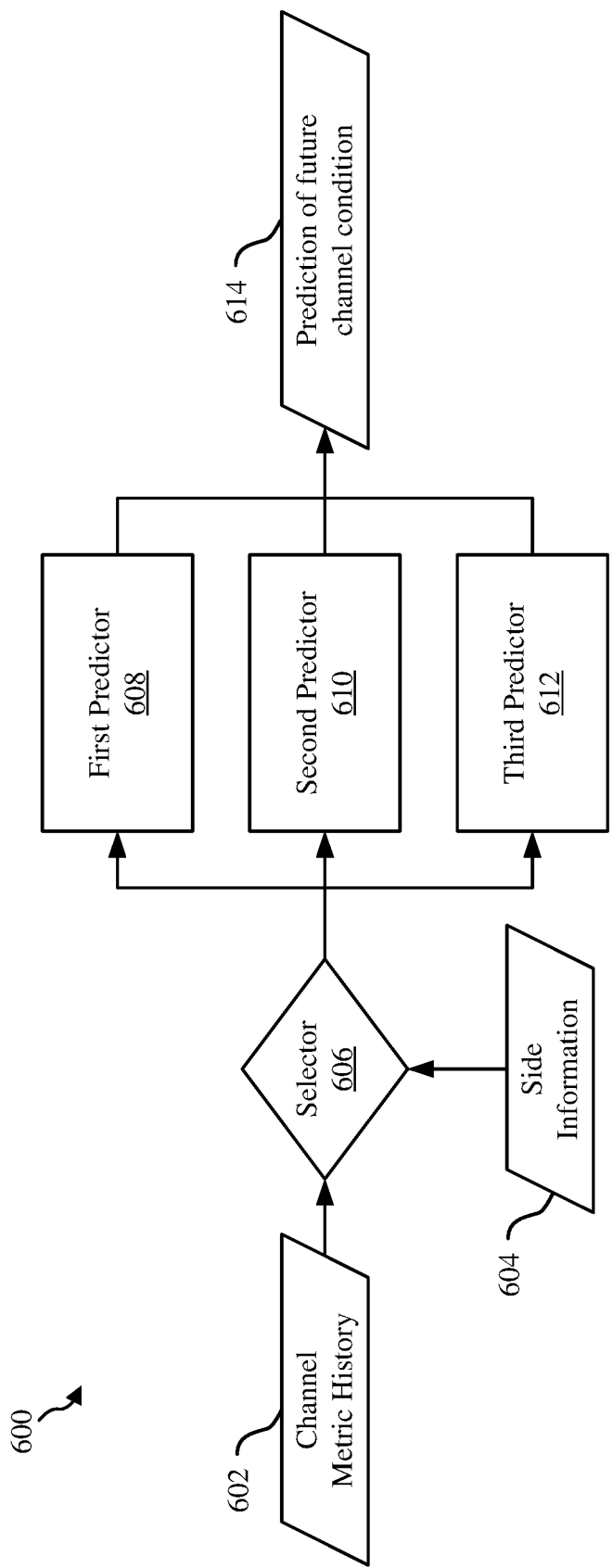
FIG. 6 is a schematic flow chart diagram illustrating a method for predicting a future channel condition in accordance with certain aspects of the disclosure.

FIG. 6 is a schematic flow chart diagram illustrating a method 600 for predicting a future channel condition. The method 600 may be performed by a UE 104 for one or more channels or beams with one or more other wireless communication devices.

The method 600 includes providing a channel metric history 602 and side information 604 to a selector 606. The channel metric history 602 may include previously measured/obtained values for a metric of a wireless channel between a UE 104 and a second device. The channel metric history 602 may include a series of previous values for one or more different channel metrics, such as RSRP, SNR, CQI, RI, PMI, and/or the like. The side information may include prediction configuration information, sensor data, mobility information, or the like. In one embodiment, the mobility information may include a delay spread measured on the channel. The sensor data may include accelerometer data, position data such as from a satellite positioning receiver, a screen use indicator, or the like.

The selector 606 may select one of a first predictor 608, a second predictor 610, or a third predictor 612 based on the channel metric history 602 and/or the side information 604. For example, each of the predictors 608-612 may be optimized for prediction future channel conditions under different conditions or scenarios. By way of example, the first predictor 608 may be configured to predict channel conditions for a first range of delay spread, the second predictor 610 may be configured to predict channel conditions for a second range of delay spread, and the third predictor 612 may be configured to predict channel conditions for a third range of delay spread. Thus, based on the delay spread, the selector 606 may select a corresponding predictor. The selector 606 may provide the channel metric history 602 and/or side information 604 to the selected predictor for generation of the prediction of a future channel condition 614.

The predictors 608, 610, and 612 each implement a method or algorithm for generating the prediction of the future channel condition 614. Each predictor may include circuitry or code for implementing a neural network, Kalman filter, and/or sets of rules for predicting the future channel condition 614. In one embodiment, each predictor includes a deep neural network that has been trained to output a future channel condition based on a series of previously measured channel conditions. In one example, a deep neural network receives one or more previous channel conditions from the channel metric history 602 and side information 604 and generates a series of values for the future channel condition, a single value indicating a likelihood that the channel condition will fall below a threshold within a specific time period, a value for an average future channel condition for a specific time period, or any other value (predicted value(s)).

The predictors 608, 610, and/or 612 may include a deep neural network that has been trained to predict a future channel condition. By way of example, a deep neural network with X input nodes at an input layer and a single node at an output layer may be trained using a data set that includes a series of real world measured values for a channel metric. For example, backpropagation or other training algorithms, which are well understood in the art, may be used to train values for weights or parameters corresponding to the nodes in the neural network. One example of training based on the real world measured values may include setting values for the weights or parameters to random values, and then adjusting those values based on iteratively computing an output based on example inputs and propagating an error or difference between the actual output and an expected output backwards through the weights in the deep neural network. In this case, given a specific timepoint in the series of training measurements, the inputs may receive a previous X number of measurements and the expected output may be an average value for a metric over the next Y seconds or milliseconds following the specific time. Thus, the neural network may be trained over a large number of iterations to predict what the average value for the metric will be for the next Y seconds or milliseconds. The trained neural network may be tested for accuracy on a set of training data not used for setting the weights to determine an expected accuracy for predicting the channel metric. If the expected accuracy meets the configuration of a wireless network or base station, it may be used by a UE or other device for prediction. This is only one example of neural network structure and training and numerous other alternative structures may be utilized in implementations based on the present disclosure.

As another example, a Kalman filter may receive a plurality of predicted values from multiple neural networks or rule based prediction generators. Because each rule or neural network may have some error, the Kalman filter may average out the error to obtain a more dependable prediction. One or more rule based predictions may be based on a slope of the metric over a specific number of measurements. Examples rules may include determining a time at which a threshold value would be reached based on a slope of measurements of the channel metric, correlation of location with failure of a specific beam, or other rules.

Based on the prediction of the future channel condition 614, the UE 104 may determine whether to report the prediction to a second device, such as a base station 102. If it is determined to report the prediction, the UE 104 may transmit an indication of the prediction to the second device.

Figure 7:
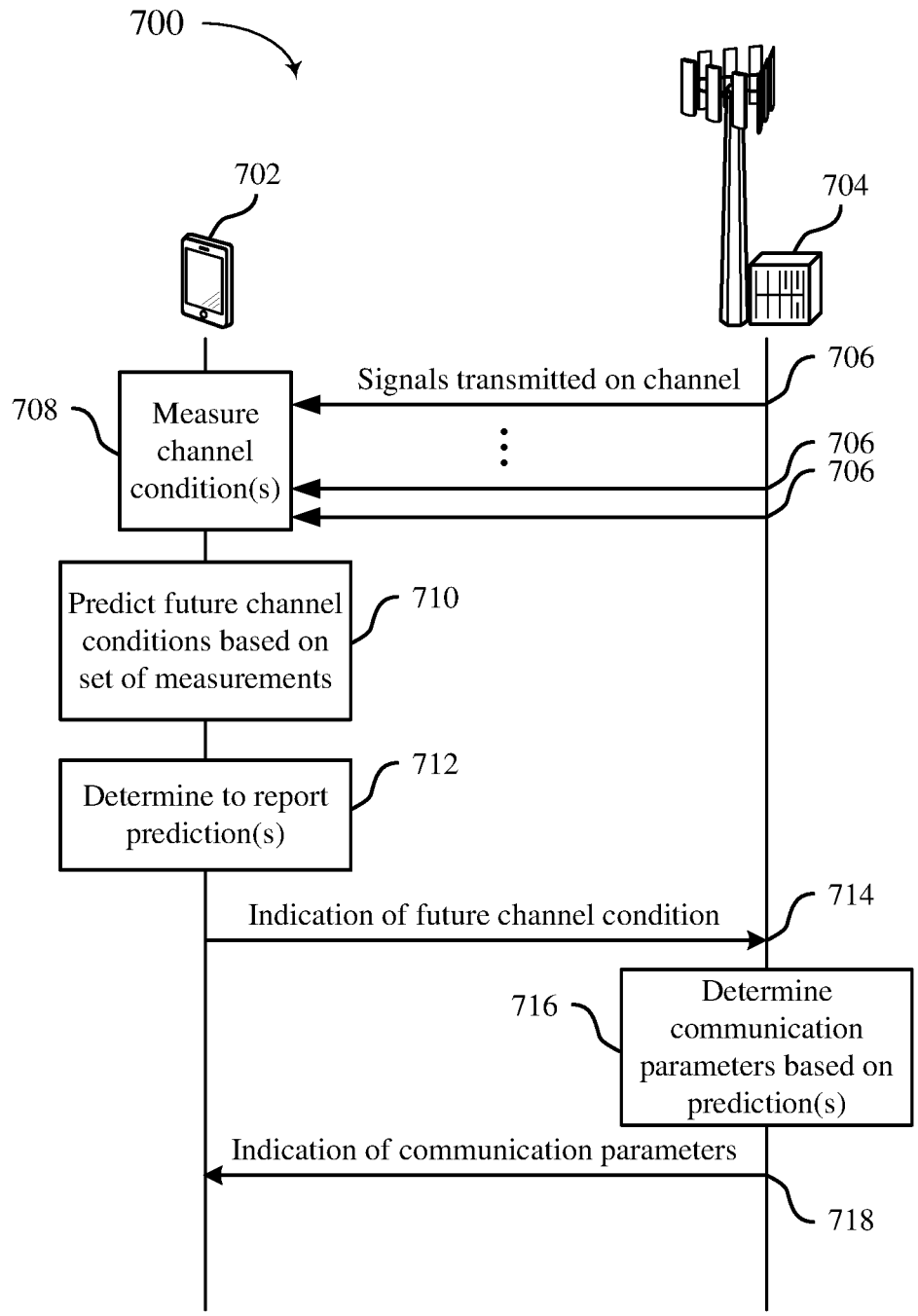
FIG. 7 is a block diagram illustrating proactive beam management in accordance with certain aspects of the disclosure.

FIG. 7 is a call flow diagram illustrating a method 700 for proactive link/beam management, in accordance with certain aspects of the disclosure. The method 700 illustrates a first device 702 and a second device 704. The first device 702 or second device 704 may each include a UE 104/350 or base station 102/310 such as those illustrated or discussed in relation to any other figure. In one embodiment, the first device 702 includes a UE 104 and the second device 704 includes a base station 102. In another embodiment, the first device 702 may include a UE 104 and the second device 704 may include another UE 104 or other wireless device.

At 706, the second device 704 transmits signals on one or more wireless channels between the second device 704 and the first device 702. The one or more wireless channels may include a downlink or peer-to-peer link channel. The signals may include reference signals on one or more different beams or channels. The signals may be sent based on preconfigured reference signal resources. The first device 702 may receive the one or more at 706.

The second device 704 may also transmit, at 706, details regarding a configuration for prediction by the first device 702 on the same or different channel. The second device 704 may transmit, and the first device 702 may receive, a configuration for reporting predicted channel conditions. In one embodiment, the configuration indicates a threshold channel condition for reporting a prediction. The configuration may also indicate a method or algorithm to be used for the predicting the future channel condition and/or a required accuracy associated with the prediction. In one embodiment, the configuration indicates a specific type of channel condition to predict. The configuration may indicate resources for reporting the future channel condition. For example, the resources for reporting the future channel conditions may be used for transmitting an indication of a prediction from the first device 702 to the second device 704. Based on the configuration, the first device 702 may determine a configuration for predictions of channel conditions. The second device 704 may monitor and/or process prediction reports from the first device 702 based on the configuration.

In one embodiment, the configuration transmitted at 706 may include an indication of future resources for which channel conditions are to be predicted. The indication of the future resources may include an indication of a future timing for the future resources. The indication of the future resources may indicate a frequency resource for the future resources. The indication of the future resources may indicate a beam for the future resources. Indications of the future resources may allow a UE to predict channel conditions for those resources, which may reduce the amount of prediction performed by the UE versus predicting for all future resources. In one embodiment, the second device 704 may inform the first device 702 of which slots in the future the second device 704 wants to receive predictions for. The first device 702 may perform predictions for those slots and report an indication of those predictions for those slots to the second device 704. Based on the predictions, the second device 704 may make scheduling or communications decisions, such as by scheduling or refraining from scheduling on the indicated future resources, by switching a beam to communicate or avoid communicating on the future resources, or the like.

At 708, the first device 702 measures channel conditions for the one or more channels based on the signals transmitted on the channel at 706. The first device 702 may measure one or more previous channel conditions by measuring and/or determining at least one channel metric of the wireless communication channel at different points in time. The channel metric may include a received power, a signal-to-noise ratio, a channel rank, or a channel quality determined based on a received reference signal from the second device 704. By measuring or determining the metric at different points in time, the first device 702 may create and/or store a series of two or more previous channel conditions spread over time to create a channel condition history or channel metric history. For example, the first device 702 may maintain a set of a number X previous measurements of the channel.

At 710, the first device 702 predicts one or more future channel conditions for the one or more channels based at least in part on channel conditions in a set of measurements. The first device 702 may predict based on the channel conditions measured at 708 and/or a configuration sent by the second device 704. The future channel condition may include a predicted metric or an indication of whether a metric will fall below a threshold at some point or within a time period in the future. The predicted future channel condition may include or be based on a value for one or more of a future received power, a future signal-to-noise ratio, a future channel rank, or a future channel quality.

The first device 702 may predict the further channel condition based on a configuration for prediction, feedback from the second device 704, previous or current channel metrics, previous or current mobility of the first device 702, and/or previous or current sensor information. In at least one embodiment, predicting based on the mobility of the first device 702 includes predicting based on one or more of sensor information of the UE or a measured doppler spread of a signal from the second device 704. Example sensor information which may be used for prediction includes accelerometer data, satellite positioning data, or other sensor data from sensors of the first device 702. The first device 702 may predict the channel condition using a method or algorithm, such as the method 600 of FIG. 6.

At 712, the first device 702 determines to report the predicted future channel conditions. The first device 702 may determine whether to predict the future channel condition based on a configuration received from the wireless communication device, such as a configuration received from the second device 704 or a network entity. The first device 702 may determine to report based on a threshold channel condition for reporting a prediction. For example, if a predicted future channel condition determined at 710 is below or above a configured threshold for that condition, the first device 712 may determine to report the prediction. The first device 702 may report the prediction based on an accuracy or confidence level associated with the prediction. The first device 702 may determine to report the predicted channel condition based on one or more of a periodic reporting configuration, a request from the wireless communication device (e.g., the second device 704), and/or based on a triggering event detected by the first device 702. An example triggering event may include a prediction that a beam failure or link failure will occur within a threshold time (e.g., within the next X slots, symbols, or transmission/reception occasions).

At 714, the first device 702 transmits an indication 714 of the future channel conditions to the second device 704 and the second device 704 receives the indication if the first device 702 determines to report the prediction at 712. The first device 702 may transmit the indication to the second device 704 on the current wireless channel/beam or a different channel/beam. The indication of the future channel condition may include an indication that the future channel condition is below a threshold channel condition or above a threshold channel condition. The indication that the future channel condition is below a threshold channel condition may be transmitted when a most recent channel condition is above the threshold channel condition. For example, even if a beam failure has not yet occurred, the indication of the future channel condition may indicate that it is predicted that beam failure is predicted to occur soon with a high likelihood, or some other likelihood. The indication may include a timing for the future channel condition. The indication may include a confidence level for the future channel condition.

At 710, 712, and 714, the second device 704 monitors for prediction reports from the first device 702. The second device 704 may monitor for the prediction reports based on a configuration for resources, timing or triggering events for the prediction reports. The second device 704 receives the indication of the future channel condition at 714 from the first device.

At 716, the second device 704 determines communication parameters for communicating with the first device 702 based on the indication of the future channel conditions. For example, the second device 704 may determine a timing to transmit a downlink data signal to avoid a time period predicted to have poor channel conditions. As another example, the second device 704 may identify a beam to use for future communications (whether to switch or remain on a current beam) with the first device 702 based on the indication at 714. In yet another example, the second device 704 may determine to handover the first device 702 to a different cell or device. In a further example, the second device 704 may determine a transmission parameter for transmitting downlink data on the same beam or channel. For example, a reduced or increased modulation and coding scheme (MCS) may be selected based on a respective reduced or increased channel quality.

At 718, the second device 704 transmits an indication of the communication parameters determined at 716. The second device 704 may transmit a beam switch instruction, a handover instruction, or other instruction to move communication with the first device 702 to a new beam, channel or cell based on the indication at 714. The second device 704 may transmit a scheduling instruction that avoids a time period with poor channel quality.

In at least some scenarios, the method 700 may allow communication between the first device 702 and another device to proactively adjust to changes in channel condition before those changes lead to degraded performance.

Figure 8:
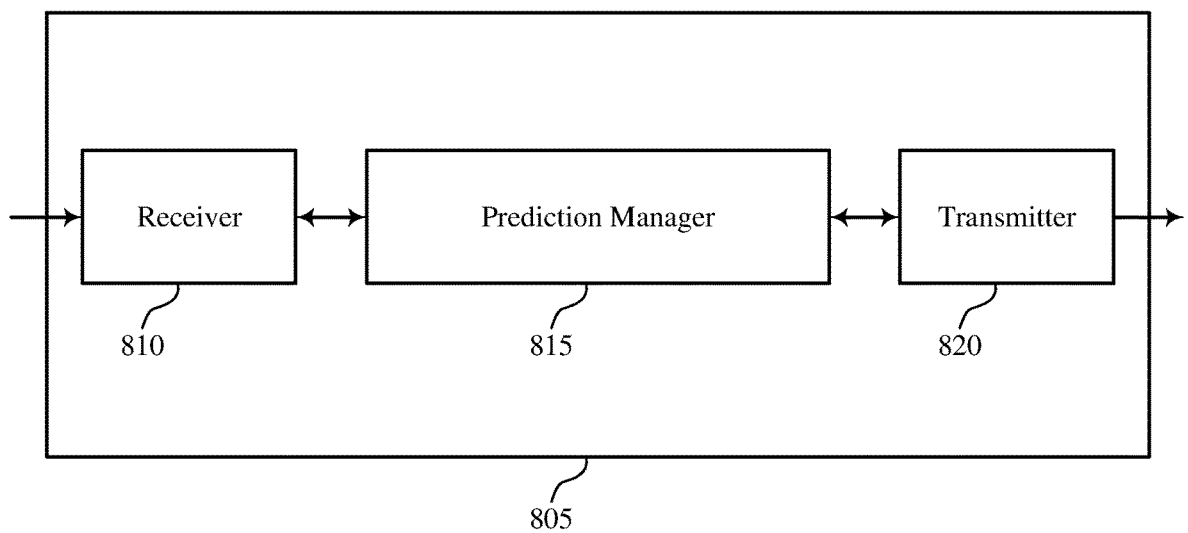
FIG. 8 is a diagram illustrating a device that supports predicting channel conditions in accordance with aspects of the present disclosure.

FIG. 8 shows a block diagram 800 of a device 805 for proactive beam management in accordance with aspects of the present disclosure. The device 805 may be an example of aspects of a UE 104/350, a base station 102/310, or any other wireless communication device (e.g., first device 702 of FIG. 7) described or discussed herein. The device 805 may include a receiver 810, a prediction manager 815, and a transmitter 820. The device 805 may also include a processor. Each of these components may be in communication with one another (e.g., via one or more buses).

The receiver 810 may receive information such as packets, user data, reference signals, prediction configuration, or control information associated with various information channels (e.g., control channels, data channels, or other channels). The information may be received on one or more links or one or more beams. Information may be passed on to other components of the device 805. The receiver 810 may utilize a single antenna or a set of antennas. The receiver 810 may receive reference signals or other signals, such as those discussed at 706 of FIG. 7.

The prediction manager 815 performs functions to predict a future channel condition on a specific channel or beam. In one embodiment, the prediction manager 815 predicts a future channel condition for a wireless communication channel between a wireless communication device and the device 805. The prediction manager may further cause the device 805 to transmit an indication of the future channel condition to the wireless communication device. The prediction manager 815 may perform any of the functions, processes, or methods discussed in FIGS. 5, 6, and 7. For example, the prediction manager 815 may include the selector 606, first predictor 608, second predictor 610, or third predictor 612 of FIG. 6, and/or may perform functions or operations such as those discussed in relation to the first device 702 at 706, 708, 710, 712, 714, and 718 of FIG. 7.

The prediction manager 815, or its sub-components, may be implemented in hardware, code (e.g., software or firmware) executed by a processor, or any combination thereof. If implemented in code executed by a processor, the functions of the prediction manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The prediction manager 815, or its sub-components, may be physically located at various positions, including being distributed such that portions of functions are implemented at different physical locations by one or more physical components. In some examples, the prediction manager 815, or its sub-components, may be a separate and distinct component in accordance with various aspects of the present disclosure. In some examples, the prediction manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. For example, the transmitter 802 may transmit reports that include an indication of a predicted future channel condition determined by the prediction manager 815. In some examples, the transmitter 820 may be collocated with a receiver 810 in a transceiver module. For example, the transmitter 820 may be an example of aspects of the transmitter/receiver 354 of FIG. 3. The transmitter 820 may utilize a single antenna or a set of antennas. The transmitter 820 may transmit signals, such as signal indicating the future channel condition at 714 of FIG. 7.

Figure 9:
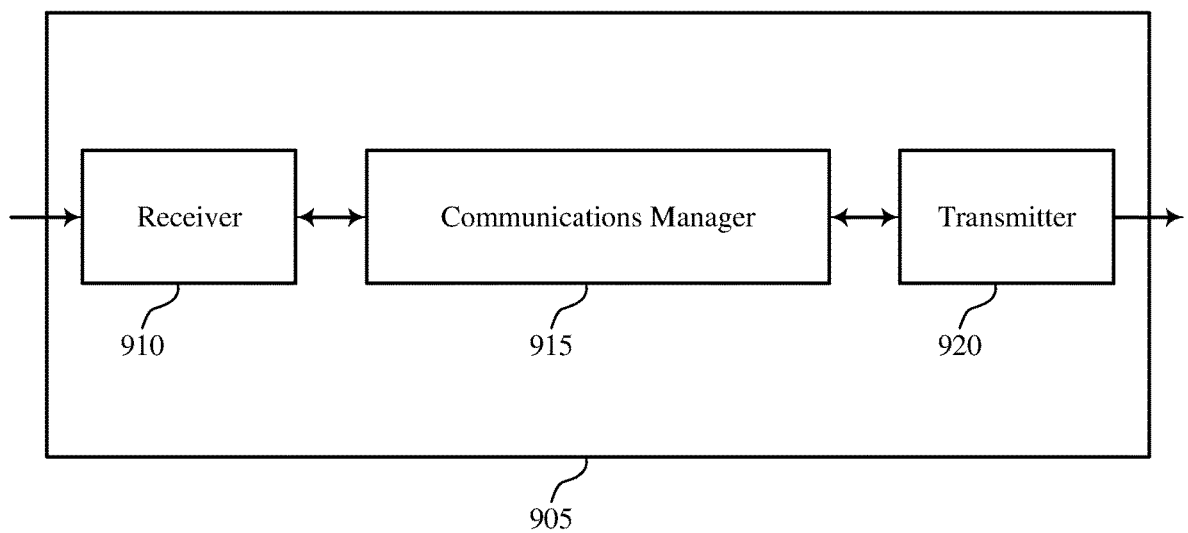
FIG. 9 is a diagram illustrating a device that supports communicating based on predictions of channel conditions in accordance with aspects of the present disclosure.

FIG. 9 shows a block diagram 900 of a device 905 for communications management in accordance with aspects of the present disclosure. The device 905 may be an example of aspects of a UE 104/350, a base station 102/310, or any other wireless communication device (e.g., second device 704 of FIG. 7) described or discussed herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, reference signals, prediction reports, or control information associated with various information channels (e.g., control channels, data channels, or other channels). The information may be received on one or more links or one or more beams. Information may be passed on to other components of the device 905. The receiver 910 may utilize a single antenna or a set of antennas. The receiver 910 may receive signals or messages such as the indication of future channel conditions at 714 of FIG. 7.

The communications manager 915 performs functions to manage a communication link by utilizing a channel or beam that provides good channel quality. In one embodiment, the communications manager 915 receives an indication of a future channel condition from a wireless communication device. The future channel condition may include a prediction of the future channel condition. The communications manager 915 may cause the device 905 to communicate with the wireless communication device based on the indication of the future channel condition. The communications manager 915 may perform any of the functions, processes, or methods discussed in FIGS. 5, 6, and 7. For example, the communications manager 915 may perform the functions or operations or other aspects discussed in relation to the second device 704 at 706, 714, 716, and/or 718 of FIG. 7.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. For example, the transmitter 902 may transmit reference signals or configuration information for another wireless device to predict and report predictions. The transmitter 902 may also transmit beam switch commands (beam switch message), handover commands (handover message), indications of communication parameters or other details determined/selected by the communications manager 915. In some examples, the transmitter 920 may be collocated with a receiver 910 in a transceiver module. For example, the transmitter 920 may be an example of aspects of the transmitter/receiver 318 of FIG. 3. The transmitter 920 may utilize a single antenna or a set of antennas. The transmitter 920 may transmit reference signals or other signals such as the signals or messages discussed at 706 and/or 718 of FIG. 7.

Figure 10:
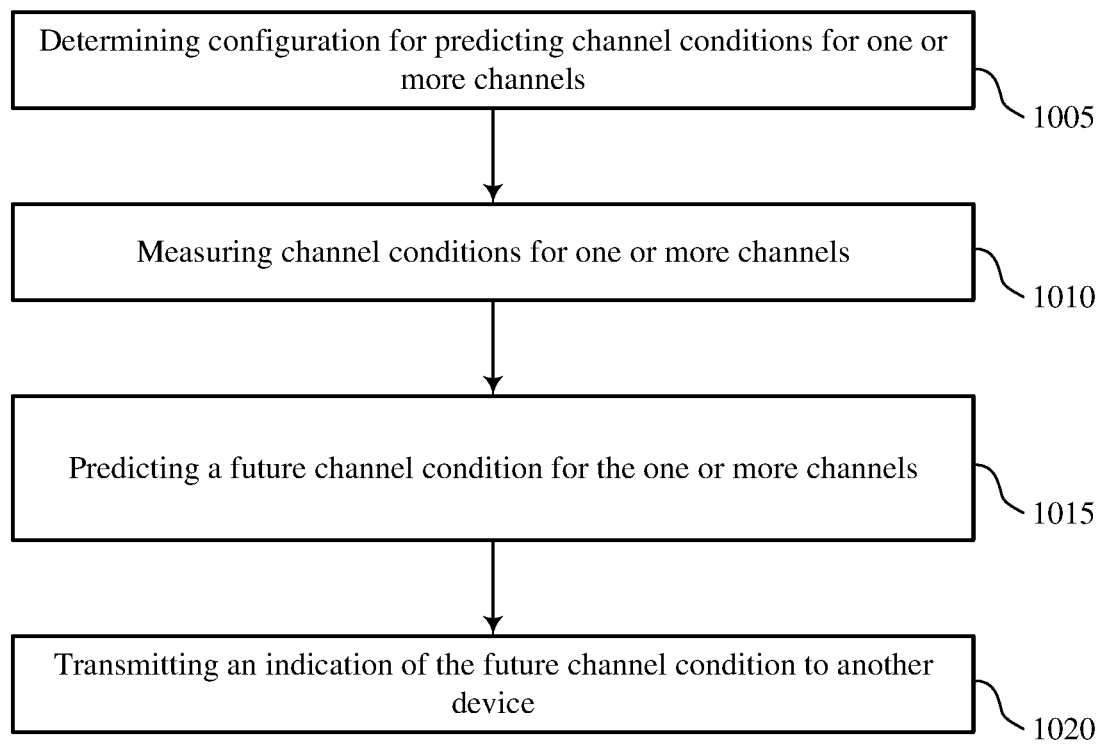
FIG. 10 is a flowchart of a method for wireless communication for predicting channel conditions, in accordance with certain aspects of the disclosure.

FIG. 10 is a flowchart of a method 1000 for wireless communication for channel prediction, in accordance with certain aspects of the disclosure. This method 1000 may be performed by any wireless communication device described or discussed herein, such as a UE 104/350, base station 102/102, or other wireless device (such as devices 702, 704, 805, and/or 905).

In the method 1000, the device determines 1005 a configuration for predicting channel conditions for one or more channels. For example, the device may determine 1005 the configuration based on configuration information received from another device or a network entity or based on pre-agreed configurations for channel prediction. The determining 1005 may include any one or more of the aspects discussed or illustrated at 190 in FIG. 1, at 502 or 504 in FIG. 5, and/or at 706 or 708 in FIG. 7.

The device measures 1010 channel conditions for one or more channels. The device may measure 1010 the channel conditions based on reference signals or other signals from another device. The measuring 1010 may include any one or more of the aspects discussed or illustrated at 502 or 504 in FIG. 5 and/or at 706 or 708 in FIG. 7.

The device predicts 1015 a future channel condition for the one or more channels. The device may predict 1015 the future channel conditions based on a configuration determined at 1005 and/or measurements at 1010. The predicting 1015 may include any one or more of the aspects discussed or illustrated at 190 in FIG. 1, at 502 or 504 in FIG. 5, in the method 600 of FIG. 6, and/or at 710 or 712 in FIG. 7.

The device transmits 1020 an indication of the future channel condition to another device. The indication may include a prediction report, beam switch command, handover request, or other indication of the prediction at 1015. The transmitting 1020 may include any one or more of the aspects discussed or illustrated at 190 in FIG. 1, in the structures of FIG. 2D, at 354 in FIG. 3, at 502 or 504 in FIG. 5, and/or at 712 or 714 in FIG. 7.

Figure 11:
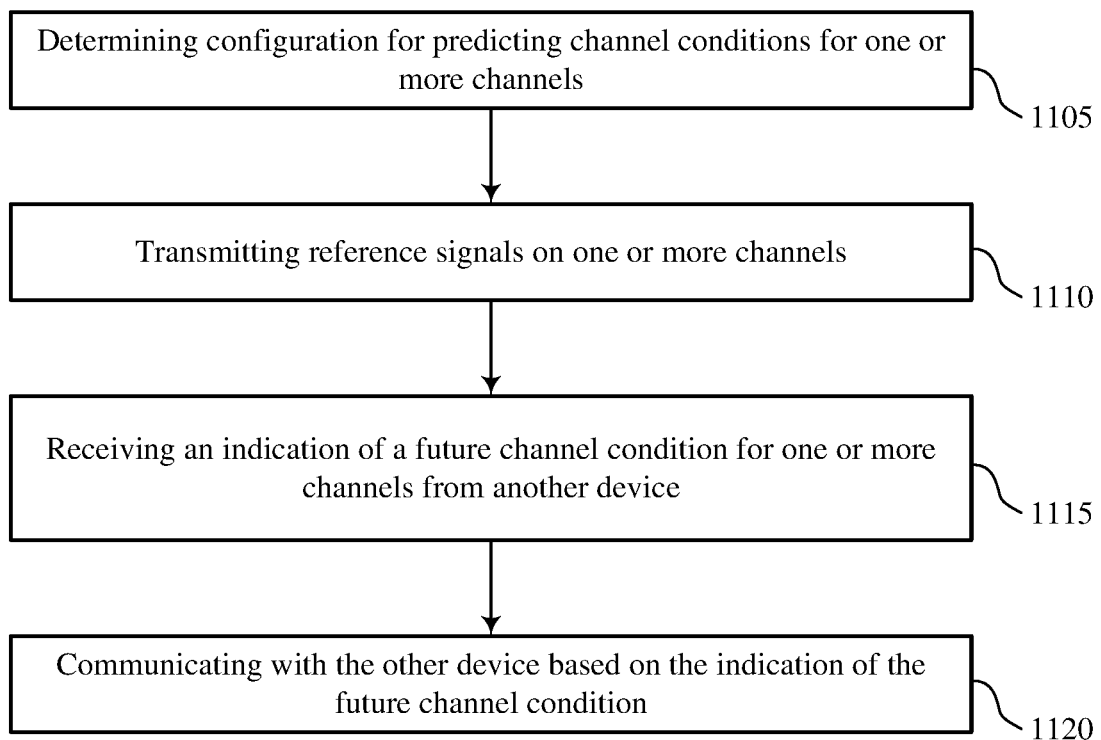
FIG. 11 is a flowchart of a method for wireless communication based on predictions of channel conditions, in accordance with certain aspects of the disclosure.

FIG. 11 is a flowchart of a method 1100 for wireless communication based on channel predictions, in accordance with certain aspects of the disclosure. This method 1100 may be performed by any wireless communication device described or discussed herein, such as a UE 104/350, base station 102/102, or other wireless device (such as devices 702, 704, 805, and/or 905).

In the method 1100, the device determines 1105 a configuration for predicting channel conditions for one or more channels. For example, the device may determine 1105 the configuration based on configuration information the device transmitted to a different device or based on pre-agreed configurations for channel prediction. The determining 1105 may include any one or more of the aspects discussed or illustrated at 195 in FIG. 1 and/or at 706 in FIG. 7.

The device transmits 1110 reference signals on one or more channels. The device may transmit 1110 reference signals or configuration information to another device to allow that other device to measure the channel and/or perform channel predictions. The device may periodically transmit 1110 the reference signals to allow the other device to measure/predict channel conditions repeatedly over time and/or based on a plurality of signals. The transmitting 1110 may include any one or more of the aspects discussed or illustrated at 195 in FIG. 1 and/or at 706 in FIG. 7.

The device receives 1115 an indication of a future channel condition for one or more channels from another device. The receiving 1115 may include any one or more of the aspects discussed or illustrated at 195 in FIG. 1, at 502 or 504 in FIG. 5, and/or at 714 or 716 in FIG. 7.

The device communicates 1120 with the other device based on the indication of the future channel condition. The device may communicate 1120 by sending a beam change instruction, a handover instruction, or indication of a transmit parameter. The communicating 1120 may include any one or more of the aspects discussed or illustrated at 195 in FIG. 1, and/or at 716 or 718 in FIG. 7.

It should be noted that the methods described herein describe possible implementations, and that the operations and the steps may be rearranged or otherwise modified and that other implementations are possible. Further, aspects from two or more of the methods may be combined.

The following examples and aspects are illustrative only and pertain to embodiments and aspects that may be combined with aspects of figures, embodiments, or examples discussed elsewhere herein.

Example 1 is a method for wireless communication at a UE. The method includes predicting a future channel condition for a wireless communication channel between a wireless communication device and the UE. The method also includes transmitting an indication of the future channel condition to the wireless communication device. In Example 2, the indication of the future channel condition of Example 1 includes an indication that the future channel condition is below a threshold channel condition. In Example 3, the indication that the future channel condition is below a threshold channel condition of Example 2 is transmitted when a most recent channel condition is above the threshold channel condition. In Example 4, the indication of the future channel condition in any of Examples 1-3 includes an indication that the future channel condition is above a threshold channel condition. In Example 5, the indication of the future channel condition in any of Examples 1-4 includes a timing for the future channel condition. In Example 6, the indication of the future channel condition in any of Examples 1-5 includes a confidence level for the future channel condition. In Example 7, the transmitting the indication of the future channel condition in any of Examples 1-6 includes transmitting based on one or more of a periodic reporting configuration, a request from the wireless communication device, or based on a triggering event detected by the UE.

In Example 8, the predicting the future channel condition in any of Examples 1-7 includes predicting based on one or more previous channel conditions of the wireless communication channel. In Example 9, the one or more previous channel conditions in Example 8 include a channel metric based on one or more measurements of the channel. In Example 10, the channel metric in Example 9 includes one or more of a received power, a signal-to-noise ratio, a channel rank, or a channel quality determined based on a received reference signal from the wireless communication device. In Example 11, the method as in any of Examples 8-10 includes determining the one or more previous channel conditions based on one or more measurements of at least one channel metric of the wireless communication channel. In Example 12, the one or more previous channel conditions in any of Examples 8-11 include a series of two or more previous channel conditions spread over time.

In Example 13, the predicting the future channel condition as in any of Examples 1-12 includes predicting based on one or more of, a configuration received from the wireless communication device, threshold channel condition for reporting a prediction, a method or algorithm to be used for the predicting the future channel condition, or an accuracy associated with the prediction. In Example 14, the predicting the future channel condition as in any of Examples 1-13 includes predicting based on feedback from the wireless communication device. In Example 15, predicting the future channel condition as in any of Examples 1-14 includes predicting based on a mobility of the UE. In Example 16, the predicting based on the mobility of the UE in Example 15 includes predicting based on one or more of sensor information of the UE or a measured doppler spread of a signal from the wireless communication device. In Example 17, the predicting the future channel condition as in any of Examples 1-16 includes predicting a value for one or more of a future received power, a future signal-to-noise ratio, a future channel rank, or a channel quality.

In Example 18, the method as in any of Examples 1-17 further includes receiving, from the wireless communication device, a configuration for reporting predicted channel conditions, wherein one or more of the predicting the future channel condition or the transmitting the indication of the future channel condition comprises predicting or transmitting based on the configuration. In Example 19, the configuration in Example 18 indicates a threshold channel condition for reporting a prediction. In Example 20, the configuration as in any of Examples 18-19 indicates a method or algorithm to be used for the predicting the future channel condition. In Example 21, the configuration as in any of Examples 18-20 indicates a required accuracy associated with the prediction. In Example 22, the configuration as in any of Examples 18-21 indicates a specific type of channel condition to predict. In Example 23, the configuration as in any of Examples 18-22 indicates resources for reporting the future channel condition. In Example 24, the configuration as in any of Examples 18-23 indicates future resources for which channel conditions are to be predicted. In Example 25, the configuration of Example 24 indicates the future resources by indicating a timing of the future resources, wherein the predicting the future channel condition comprise predicting the future channel condition for the future resources, and wherein transmitting the indication of the future channel condition comprises transmitting the indication of the future channel condition for the future resources.

Example 26 is a method for wireless communication at a base station. The method includes receiving an indication of a future channel condition from a wireless communication device. The method includes communicating with the wireless communication device based on the indication of the future channel condition. In Example 27, the communicating with the wireless communication device based on the indication of the future channel condition in Example 26 includes scheduling communications with the wireless communication device based on the indication of the future channel condition. In Example 28, the communicating with the wireless communication device based on the indication of the future channel condition in Example 27 includes transmitting a beam switch message or a handover message to the wireless communication device based on the indication. In Example 29, the method as in any of Examples 26-28 further include sending one or more reference signals to the wireless communication device, wherein the wireless communication device predicts the future channel condition based on the one or more reference signals.

In Example 30, the indication of the future channel condition as in any of Examples 26-29 is below a threshold channel condition. In Example 31, the indication of the future channel condition as in any of Examples 26-30 includes an indication that the future channel condition is above a threshold channel condition. In Example 32, the indication of the future channel condition as in any of Examples 26-29 includes a timing for the future channel condition. In Example 33, the indication of the future channel condition as in any of Examples 26-22 includes a confidence level for the future channel condition. In Example 34, the future channel condition as in any of Examples 26-33 includes a predicted value for one or more of a future received power, a future signal-to-noise ratio, a future channel rank, or a channel quality. In Example 35, the method as in any of Examples 26-34, further includes determining a configuration for predictions of channel conditions, wherein receiving the indication of the future channel condition comprises receiving based on the configuration.

In Example 36, the method as in any of Examples 26-35 further includes sending an indication of a configuration for predictions of channel conditions, wherein the receiving the indication of the future channel condition comprises receiving based on the configuration. In Example 37, the configuration of Example 36 indicates a threshold channel condition for reporting predictions of channel conditions. In Example 38, the configuration as in any of Examples 36-37 indicates a method or algorithm to be used for predictions of channel conditions. In Example 39, the configuration as in any of Examples 36-38 indicates a required accuracy associated with predictions of channel conditions. In Example 40, the configuration as in any of Examples 36-39 indicates a specific type of channel condition to predict. In Example 41, the configuration as in any of Examples 36-40 indicates resources for reporting the future channel condition. In Example 42, the configuration as in any of Examples 26-41 indicates future resources for which channel conditions are to be predicted. In Example 43, the configuration of Example 42 indicates the future resources by indicating a timing of the future resources, wherein the receiving the indication of the future channel condition comprises receiving an indication of the future channel condition for the future resources.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication at a user equipment (UE), the method comprising:
    predicting a future channel condition for a wireless communication channel between a wireless communication device and the UE, wherein predicting the future channel condition comprises predicting that a beam failure or link failure will occur within a threshold time;
    determining whether to report the future channel condition based on the future channel condition being above or below a threshold channel condition, wherein determining to report the future channel condition further comprise determining to report based on predicting that the beam failure or link failure will occur within the threshold time; and
    transmitting an indication of the future channel condition to the wireless communication device based on the determining.

2. The method of claim 1, wherein the indication that the future channel condition is below the threshold channel condition is transmitted when a most recent channel condition is above the threshold channel condition.

3. The method of claim 1, wherein the indication of the future channel condition comprises a timing for the future channel condition.

4. The method of claim 1, wherein the indication of the future channel condition comprises a confidence level associated with a prediction for the future channel condition.

5. The method of claim 1, wherein the transmitting the indication of the future channel condition comprises transmitting based on one or more of:
    a periodic reporting configuration; or
    a request from the wireless communication device.

6. The method of claim 1, wherein the predicting the future channel condition comprises predicting based on one or more previous channel conditions of the wireless communication channel.

7. The method of claim 1, wherein the predicting the future channel condition comprises predicting based on one or more of:
    a configuration received from the wireless communication device;
    a method or algorithm to be used for the predicting the future channel condition; or
    an accuracy associated with the prediction.

8. The method of claim 1, wherein the predicting the future channel condition comprises predicting based on feedback from the wireless communication device.

9. The method of claim 1, wherein the predicting the future channel condition comprises predicting based on a mobility of the UE or a doppler spread.

10. The method of claim 1, the method further comprising receiving, from the wireless communication device, a configuration for reporting predicted channel conditions, wherein one or more of the predicting the future channel condition or the transmitting the indication of the future channel condition comprises predicting or transmitting based on the configuration.

11. A method for wireless communication at a base station, the method comprising:
    sending an indication of a configuration for predictions of channel conditions to a wireless communication device, wherein the configuration indicates a threshold channel condition for reporting predictions;
    receiving an indication of a future channel condition from the wireless communication device based on the configuration, wherein the indication of the future channel condition comprises an indication that a beam failure or link failure will occur within a threshold time; and
    communicating with the wireless communication device based on the indication of the future channel condition.

12. The method of claim 11, wherein communicating with the wireless communication device based on the indication of the future channel condition comprises scheduling communications with the wireless communication device based on the indication of the future channel condition.

13. The method of claim 12, wherein communicating with the wireless communication device based on the indication of the future channel condition comprises transmitting a beam switch message or a handover message to the wireless communication device based on the indication.

14. The method of claim 11, further comprising sending one or more reference signals to the wireless communication device, wherein the wireless communication device predicts the future channel condition based on the one or more reference signals.

15. The method of claim 11, wherein the indication of the future channel condition comprises an indication that the future channel condition is below a threshold channel condition.

16. The method of claim 11, wherein the indication of the future channel condition comprises a timing for the future channel condition.

17. The method of claim 11, wherein the indication of the future channel condition comprises a confidence level for the future channel condition.

18. The method of claim 11, wherein the future channel condition comprises a predicted value for one or more of a future received power, a future signal-to-noise ratio, a future channel rank, or a channel quality.

19. The method of claim 11, further comprising determining a configuration for predictions of channel conditions, wherein receiving the indication of the future channel condition comprises receiving based on the configuration.

20. A user equipment (UE) for wireless communication, the UE comprising:
    one or more processors;

a memory in electronic communication with the one or more processors, the memory storing instructions which, when executed by the one or more processors, cause the apparatus to:

predict a future channel condition for a wireless communication channel between a wireless communication device and the UE, wherein the instructions cause the apparatus to predict the future channel condition by predicting that a beam failure or link failure will occur within a threshold time;

determine whether to report the future channel condition based on the future channel condition being above or below a threshold channel condition, wherein the instructions cause the apparatus to determine to report the future channel condition by determining to report based on predicting that the beam failure or link failure will occur within the threshold time; and transmit an indication of the future channel condition to the wireless communication device based on the determining.

21. The UE of claim 20, wherein the indication that the future channel condition is below the threshold channel condition is transmitted when a most recent channel condition is above the threshold channel condition.

22. The UE of claim 20, wherein the indication of the future channel condition comprises a timing for the future channel condition.

23. The UE of claim 20, wherein the indication of the future channel condition comprises a confidence level associated with the prediction for the future channel condition.

24. The UE of claim 20, wherein the instructions cause the apparatus to transmit the indication of the future channel condition based on one or more of:
  a periodic reporting configuration; or
  a request from the wireless communication device.

25. The UE of claim 20, wherein the instructions cause the apparatus to predict the future channel condition based on one or more previous channel conditions of the wireless communication channel.

26. The UE of claim 20, wherein the instructions cause the apparatus to predict the future channel condition based on one or more of:
  a configuration received from the wireless communication device;
  a method or algorithm to be used for the predicting the future channel condition; or
  an accuracy associated with the prediction.

27. The UE of claim 20, wherein the instructions cause the apparatus to predict the future channel condition based on feedback from the wireless communication device.

28. The UE of claim 27, wherein the instructions cause the apparatus to predict the future channel condition based on a mobility of the UE or a doppler spread.

29. The UE of claim 20, wherein the instructions further cause the apparatus to receive, from the wireless communication device, a configuration for reporting predicted channel conditions, wherein one or more of the predicting the future channel condition or the transmitting the indication of the future channel condition comprises predicting or transmitting based on the configuration.

30. An apparatus for wireless communication, the apparatus comprising:
  one or more processors;
  a memory in electronic communication with the one or more processors, the memory storing instructions which, when executed by the one or more processors, cause the apparatus to:
    send an indication of a configuration for predictions of channel conditions to a wireless communication device, wherein the configuration indicates a threshold channel condition for reporting predictions;
    receive an indication of a future channel condition from a wireless communication device based on the configuration, wherein the indication of the future channel condition comprises an indication that a beam failure or link failure will occur within a threshold time; and
    communicate with the wireless communication device based on the indication of the future channel condition.

31. The apparatus of claim 30, wherein communicating with the wireless communication device based on the indication of the future channel condition comprises scheduling communications with the wireless communication device based on the indication of the future channel condition.

32. The apparatus of claim 31, wherein communicating with the wireless communication device based on the indication of the future channel condition comprises transmitting a beam switch message or a handover message to the wireless communication device based on the indication.

33. The apparatus of claim 30, further comprising sending one or more reference signals to the wireless communication device, wherein the wireless communication device predicts the future channel condition based on the one or more reference signals.

34. The apparatus of claim 30, wherein the indication of the future channel condition comprises an indication that the future channel condition is below a threshold channel condition.

35. The apparatus of claim 30, wherein the indication of the future channel condition comprises a timing for the future channel condition.

36. The apparatus of claim 30, wherein the future channel condition comprises a predicted value for one or more of a future received power, a future signal-to-noise ratio, a future channel rank, or a channel quality.

* * * * *